United States Patent

[11] 3,590,261

| [72] | Inventors | Richard K. Snook<br>Bridgeton;<br>John C. Burton, Saint Louis, both of, Mo. |
|---|---|---|
| [21] | Appl. No. | 847,999 |
| [22] | Filed | Aug. 6, 1969 |
| [45] | Patented | June 29, 1971 |
| [73] | Assignee | Diginetics Incorporated |

[54] OPTOELECTRIC TRANSDUCERS WHICH UTILIZE A SINGLE LIGHT SOURCE TO PRODUCE BOTH ANALOG AND DIGITAL OUTPUTS
17 Claims, 12 Drawing Figs.

[52] U.S. Cl. .................................................. 250/231 R, 250/231 P, 250/237 G
[51] Int. Cl. ..................................................... G01d 5/34, H01j 3/14
[50] Field of Search .......................................... 250/231, 237 G, 219 ID

[56] References Cited
UNITED STATES PATENTS

| 2,886,717 | 5/1959 | Williamson et al. | 250/237 G |
| 3,254,225 | 5/1966 | Sklaroff et al. | 250/231 |
| 3,308,303 | 3/1967 | Weichselbaum et al. | 250/231 |
| 3,495,777 | 2/1970 | Evalds et al. | 250/231 X |

Primary Examiner—James W. Lawrence
Assistant Examiner—T. N. Grigsby
Attorney—Robert J. Schapp ABSTRACT: A transducer which measures the change of a measured physical variable such as temperature or pressure, etc. by means of a mechanically actuable element such as a bourdon tube. The mechanically actuable element is connected to and moves a shutter responsive to actuation of the element. The shutter is disposed in light interrupting position between an aligned source of light and a photocell and, therefore, the electrical output is an analog function of the movement of the shutter. A direct reading digital output transducer differs from the analog output transducer in that the shutter is transparent and provided with a diffraction grating, or ronchi ruling or the like which coacts with a stationary diffraction grating located in a plane perpendicular to the path of light. Movement of the shutter produces a Moire pattern on the photocell to produce a digital output.

PATENTED JUN 29 1971
3,590,261
SHEET 1 OF 2
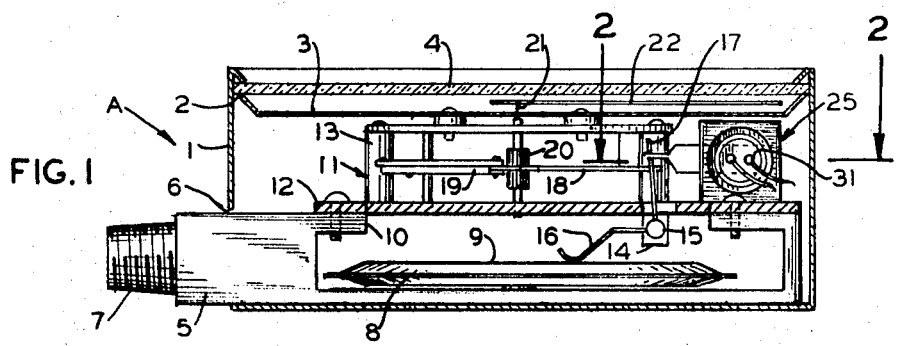
FIG. 1
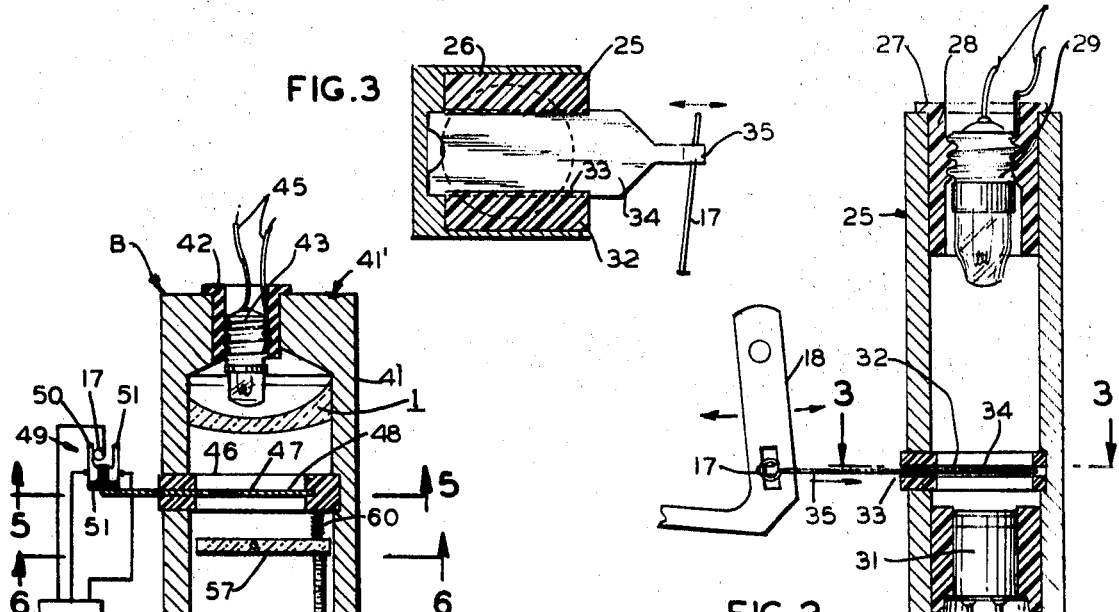
FIG. 3
FIG. 4
FIG. 2
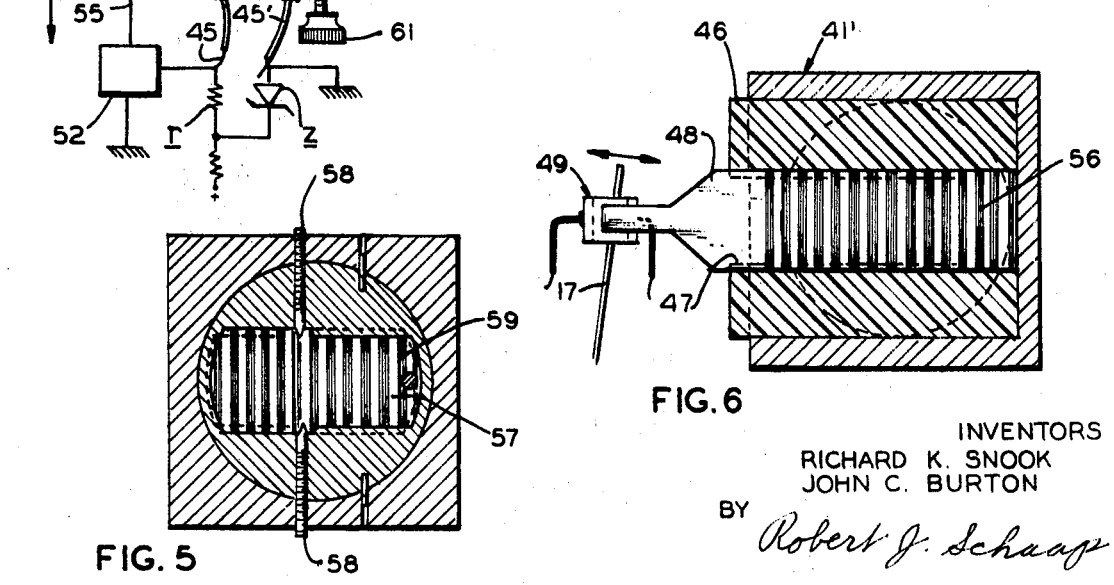
FIG. 5
FIG. 6
INVENTORS
RICHARD K. SNOOK
JOHN C. BURTON
BY Robert J. Schaap
ATTORNEY

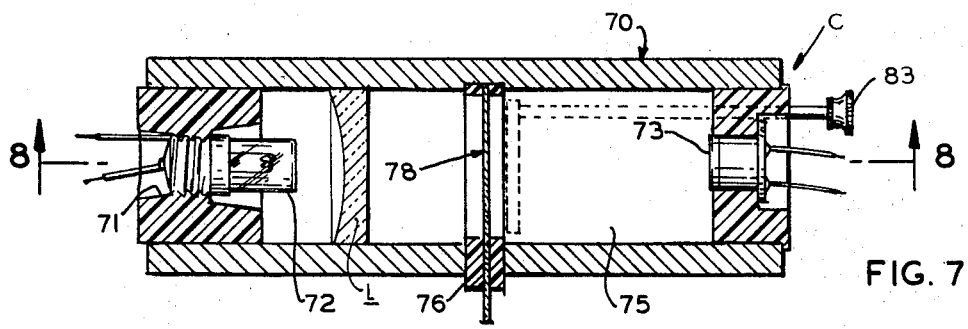
FIG. 7
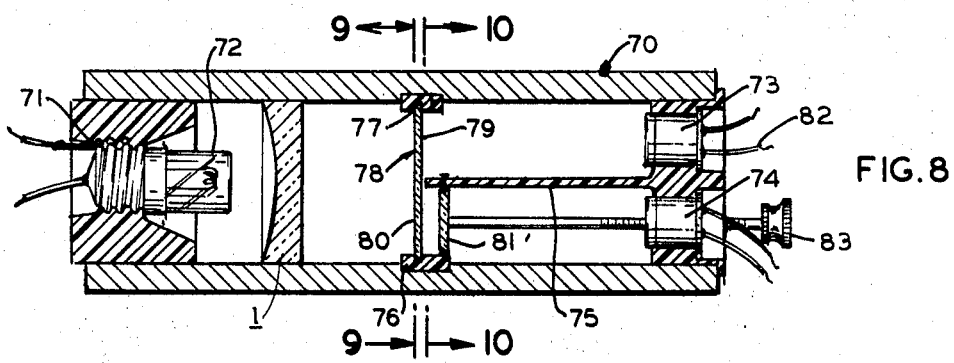
FIG. 8
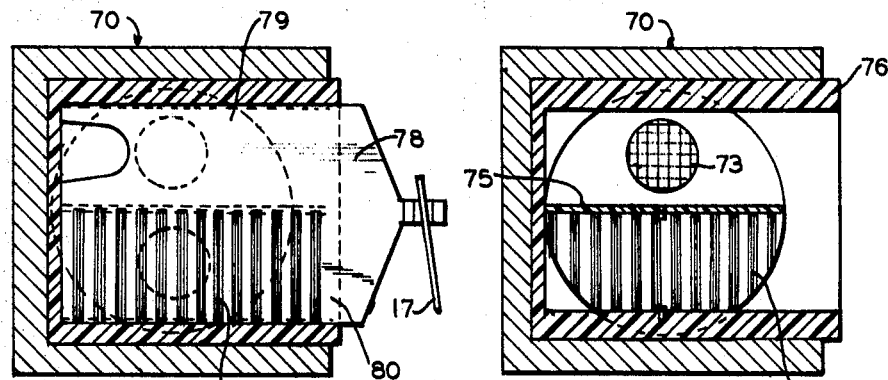
FIG. 9   FIG. 10
FIG. 11
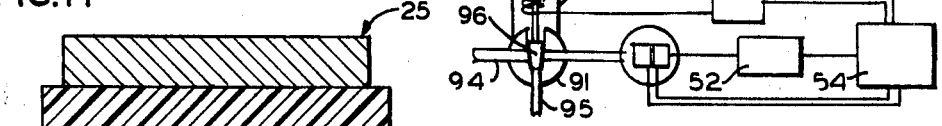
FIG. 12
INVENTORS
RICHARD K. SNOOK
JOHN C. BURTON
BY
*Robert J. Schaap*
ATTORNEY

OPTOELECTRIC TRANSDUCERS WHICH UTILIZE A SINGLE LIGHT SOURCE TO PRODUCE BOTH ANALOG AND DIGITAL OUTPUTS

The invention relates in general to certain new and useful improvements in transducers, and more particularly to mechanically actuable transducers which are capable of providing a direct readout, either in analog or digital form.

In recent years, there has been the introduction of a large number of transducers which sense the existing state of conditions or change of conditions of a measurable physical variable such as pressure or temperature. Exemplary of the pressure transducers which measure pressure conditions are bourdon tubes, metallic bellows, etc.

Typically, the aneroid can type of pressure transducer includes two chambers, one of which communicates with the atmosphere or ambient pressure condition and the other of which communicates with the system pressure conditions which are to be measured. This transducer which acts as a variable resistance device includes a diaphragm which extends between these two chambers. A strain gauge is bonded to the diaphragm which serves to detect changes in the pressure condition. A stressing of the strain gauge produces a change of resistance proportional to the elongation of the gauge. An electrical output can be transmitted to a remote exciting signal source and amplifier system for readout of the pressure condition at the remote source. Generally, an amplifier system must be interposed between the aneroid can and the readout device at the remote source in order to amplify the signal from the strain gauge. The change of resistance with stress, or gauge factor is small. Furthermore, gauge factor is a function of temperature. Accordingly, the use of bridge circuits with a nonstressed gauge in one leg as a compensation mechanism, together with differential amplifier and sophisticated shielding and balancing techniques is necessitated.

Temperature conditions are frequently measured by transducers of the type which include a bimetallic strip or a thermocouple. The bimetallic strip is a mechanically actuable element which requires an auxiliary device for conversion of the mechanical motion to a form of electrical energy in order to transmit the data to a remote source. The thermocouple does produce an electrical signal, but the output of the presently available thermocouples is quite small and hence a power source and amplification system is needed for transmitting any such signal. Furthermore, many systems which employ thermocouple type transducers require meters of a high degree of sensitivity. Notwithstanding, the presently available transducers such as thermocouples and bimetallic strips are not sufficiently accurate for many applications. For example, the thermocouple typically measures the difference between a hot and cold junction and accordingly, the cold junction thermal environment is significant as is the cable resistance which can change with temperature. When bimetallic strips are used, a potentiometer may be connected to the bimetallic strip for creating an electrical readout; but hysteresis and transducer inertia and frictional loading often effect the accuracy of such systems.

It is, therefore, the primary object of the present invention to provide a transducer which converts a measured physical variable to an electrical output by means of a radiation sensitive system and which electrical output is directly connectable to an analog readout type device.

It is another object of the present invention to provide a transducer which converts the measured physical variable to an electrical output by means of a radiation sensitive system and which electrical output is directly connectable to a digital readout type device.

It is a further object of the present invention to provide a direct readout transducer which is capable of providing a direct proximate readout and simultaneously provide a direct remote readout.

It is also an object of the present invention to provide a transducer which is extremely accurate, highly efficient in its operation and is relatively economical to manufacture.

With the above and other objects in view, my invention resides in the novel features of form, construction, arrangement, and combination of parts presently described and pointed out in the claims.

In the accompanying drawings:

FIG. 1 is a vertical sectional view of a transducer forming part of and embodying the present invention;

FIG. 2 is a fragmentary horizontal sectional view taken along line 2–2 of FIG. 1;

FIG. 3 is a fragmentary sectional view taken along line 3–3 of FIG. 2;

FIG. 4 is a horizontal sectional view, illustrating a digital readout transducer constructed in accordance with and embodying the present invention and schematically illustrating portions of the electrical components associated with the digital readout transducer;

FIGS. 5 and 6 are vertical sectional views taken along lines 5–5 and 6–6, respectively of FIG. 4;

FIG. 7 is a horizontal sectional view, illustrating a portion of a digital-analog readout transducer of the present invention.

FIG. 8 is a sectional view taken along line 8–8 of FIG. 7;

FIGS. 9 and 10 are horizontal sectional views taken along lines 9–9 and 10–10 respectively of FIG. 8;

FIG. 11 is a sectional view similar to FIG. 9 and showing a modified form of shutter mechanism employed in the transducer of FIG. 1; and FIG. 12 is a schematic illustration of a circuit interrupting compensating apparatus which can be used with either the transducer of FIG. 4 or FIG. 11.

GENERAL DESCRIPTION

Generally speaking, the present invention relates to mechanically actuated transducers which are capable of sensing a measured physical variable, such as pressure, temperature, mechanical motion, etc., and converting such physical variable to a correlated electrical output. This output is suitable for transmission to remote sites and for connection to a direct readout device where the change in or the steady state condition of the measured physical variable can be visually displayed on such direct readout device.

In one embodiment of the present invention, a combination pressure transducer and direct readout gauge formed as a unitary member and providing an analog type output is illustrated and described. In another embodiment of the present invention, a pressure transducer, which provides a digital output, is illustrated and described.

The transducers of the present invention operate on a principal that a motion producing force, such as that produced by a movable element, can be used to shift a gate or shutter mechanism between a radiation emitter and a radiation sensitive device, such as a photocell. The amount of shutter movement responsive to movement of the movable element controls the amount of light incident on the radiation sensitive element and in direct proportion to the movement of the movable element. The radiation sensitive element produces an output which is, therefore, directly proportional to the movement of the movable element. Accordingly, mechanical motion sensed by a transducer can be directly converted to a proportional electrical output.

In order to provide the digital output, a stationary replica grating is interposed between the shutter mechanism and the radiation sensitive element. The shutter is made of a transparent member, which also has a replica of a diffraction grating thereon. Accordingly, if the shutter is moved in a path perpendicular to the path of the radiation, the effective amount of light projected against the radiation sensitive element is changed in direct proportion to the movement of the shutter.

More specifically, in one embodiment of the present invention, a pressure transducer is illustrated and described and which comprises an aneroid type can for sensing the changes in a pressure condition. By a suitable link mechanism, a movable arm shifts a shutter located between a source of light and a photocell. The amount of light incident on the photocell is a direct function of movement of the shutter and movable arm, which is, in turn, a function of the expansion or contraction of the aneroid can. The output of the photocell in the form of an analog type signal, is therefore directly proportional to the pressure condition sensed by the aneroid can.

In another embodiment of the present invention, a digital pressure transducer is illustrated. In this transducer, an aneroid can which shifts a movable arm and shutter is also employed. A replica of a diffraction grating is disposed between the shutter and the photocell. The shutter mechanism in the digital transducer is transparent to the wavelength of radiation emitted by the light source and is provided with a coacting replica of a diffraction grating. The motion of line shadows resulting from movement of the shutter in response to pressure conditions, produces a Moire pattern on the photocell. A conventional pulse counter can be used to count the number of line crossings or pulses produced which is, in turn, proportional to the change of the pressure condition sensed by the aneroid can.

In a third embodiment of the present invention, a combination digital and analog type transducer is illustrated and described. In this latter type of transducer, an aneroid can which shifts a movable arm and shutter are also employed. The shutter is movable between two individual and discrete light paths, each of which includes a photocell having radiation incident thereon from a common source of light. One portion of the shutter is opaque and controls the amount of light incident on the photocell in the first light path responsive to the movement of the shutter. The amount of light incident on this photocell produces a proportional analog output. The second portion of the shutter is transparent and is provided with a replica of a diffraction grating which coacts with a second replica of a diffraction grating located in the second light path. The output of the photocell in the second light path will thereby produce a digital output in the manner previously described, responsive to the movement of the shutter.

DETAILED DESCRIPTION

Analog Transducer

Referring now in more detail and by reference characters to the drawings which illustrate practical embodiments of the present invention, A designates a pressure transducer illustrated in the vertical sectional view of FIG. 1 and generally comprising an outer housing 1. Suitably retained on the upper end of the housing 1 by means of a rim 2 is a dial face 3 having desired indicia such as pressure, e.g., in pounds per square inch imprinted on the upper surface thereof. A protective glass covering or other transparent medium 4 is disposed above and in spaced relation to the dial face 3.

Also mounted in the housing 1 is a metal manifold 5 which extends outwardly through an aperture 6 formed in the housing 1 and terminates in a threaded fitting or so-called "nipple" 7 for attachment to a suitable pressure line, or for threading into a conventional fitting. The manifold 5 is provided with suitable fluid ducts for fluidwise connection with conventional aneroid can or bellows 8 or so-called "pressure can". The upwardly presented surface of the can 8 serves as a diaphragm 9 and is expandable in a vertical direction responsive to an increase in pressure in the can 8.

The manifold is integrally provided with a pair of spaced opposed inwardly extending flange plates 10 for supporting a mechanical motion converter 11. The motion converter 11 is provided with a baseplate 12 having a plurality of upstanding posts 13. Mounted on the underside of the baseplate 12 are a pair of depending brackets 14 which carry a pivotal rod 15 suitably journaled and retained in the brackets 14. Mounted on the rod 15 and being pivotal therewith is a sensing arm 16 which rides on the diaphragm 9 of the aneroid can 8 and is movable in response to expansion thereof. Accordingly, a pressure condition in the can 8 will cause expansion of the diaphragm 9 that is to so extension in a vertical direction. Accordingly, the sensing arm 16, which rides on the bellows 9, will be shifted slightly upwardly and cause rotation of the shaft 15 in the clockwise direction, reference being made to FIG. 1.

An upwardly extending pin 17, which rides on the rod 15 and is pivotal therewith will cause rotational movement of a link mechanism 18 consisting of a series of links which ride on the upstanding posts 13. One of the links carries a gear segment 19 which engages a matching gear 20 upon an upstanding needle shaft 21. A conventional indicator needle 22 is connected to the upper end of the shaft 21 and is movable therewith. Accordingly, as the rod 15 rotates, it will cause movement of the upstanding arm 17 which, in turn, enables the mechanism 18 to cause rotation of the shaft 21 and the needle 22. Thus, a pressure condition existing in the pressure can 8 can be conveniently read from the indicia on the dial face 3.

Also mounted on the upper face of the base plate 10 is a motion-to-electrical converter 25 which includes an outer metallic housing 26 and is more fully illustrated in FIG. 2. Motion-to-electrical converters are frequently referred to in the art as process-electrical converters or so-called P-E converters and accordingly, the converter 25 will be referred to for convenience herein as P-E converters. The housing 26 is in the form of an open-ended tubular member having a conventional sleeve 27 disposed in one end which retains a conventional light socket 28 and an exciter lamp 29, in the manner as illustrated in FIG. 2. An electrical conductor 30 extends from the socket 28 and can be connected to a suitable source of electrical current (not shown). Mounted in the other end of the housing 26 is a photocell or similar conventional light sensitive transducer 31. The transducer 31 may also be connected to a source of electrical current by means of a conductor 30. The sleeve 27 holding the light sensitive transducer 31 may be conveniently retained in the housing 26 by means of a suitable epoxy resin or other means for securing the same.

One sidewall of the housing 26 is cut away in the provision of a slot to accommodate a light transparent block 32 which is provided with a keyway 33 for accommodating a shiftable gate or shutter 34, a link 35 is pivotally connected to the outer end of the shutter 34 and the upstanding pin 15 for movement therewith. Thus, it can be seen that as the pin 15 is pivoted responsive to pressure conditions in the aneroid can 8, the shutter 34 will shift inwardly and outwardly in the keyway 33. If the pressure in the can 8 should increase, the rod 15 will rotate in a clockwise direction causing the pin 17 to also shift in a clockwise direction. As this occurs, the shutter 34 will be shifted inwardly in a light blocking condition in the housing 26. In like manner, a pressure reduction will cause the shutter 34 to shift outwardly of the housing 26. Accordingly, it can be seen that the amount of light which is incident on the photocell 31 is proportional to the location of the shutter 34.

The exciter lamp 29 is designed to be operated by a low voltage so that the principal portion of the radiation emission from the lamp 29 is located in the infrared range. The photocell 31 is designed to have a peak sensitivity in the infrared radiation wavelength range so that any possible unauthorized entry of light from an extraneous source does not effect the reading. Furthermore, the housing 26 is substantially lighttight in order to substantially eliminate unauthorized light admission to the interior of the housing 26. By reason of the low voltage source used to energize the exciter lamp 29, the lamp 29 will have an unusually long life and furthermore, the filament in the lamp 29 will be substantially less failure prone due to vibration.

The photocell 31 is preferably a cadmium sulfide photocell where the internal resistance thereof is a function of the amount of light incident upon the active surface of the photocell. It should be recognized, however, that photovoltaic photocells such as lithium sulfide or selenium oxide could also be employed by use of proper and conventional circuitry. In like manner, it is also possible by employment of conventional circuitry to use photomultiplier tubes or other "vacuum tube" type photocells in place of the photocell 31. The photocell 31 has an output 36 in the form of an analog electrical signal which can be transmitted over conductors to a gauge (not shown) located at a remote site for readout of pressure conditions at the remote sites. Furthermore, it should be recognized that the output 36 could be connected to any suitable electrical readout device or recorder such as a tape recorder or a chart recorder, or even an analog computer for recording and analyzing the output of the transducer.

It may be desirable in some applications to carefully control the voltage to the photocell 31 as well as to the exciter lamp 29. Conventional Zener diode control devices could be employed in both cases. However, as indicated above, since the exciter lamp 29 is operating on a low voltage, the maximum change in light output resulting from a change in voltage supply is quite small. Accordingly, the need for conventional stabilizing networks only arises where a high degree of accuracy may be needed.

It is possible to modify the transducer A in order to provide a nonlinear analog output by employing an alternate form of shutter mechanism, such as that illustrated in FIG. 11. By carefully controlling the geometric pattern of the shutter mechanism, it is possible to produce an output to render a desired transfer function. The shutter mechanism illustrated in FIG. 11 generally comprises a fixed radiation interrupter 37, which has an integrally formed inwardly extending tapered section 38, having a triangular cross section and terminating in a point 39. The shutter 34 is also provided with a triangularly shaped terminal portion 40 in the manner as illustrated in FIG. 11. This type of shutter mechanism will provide a log output function of the input signal to the transducer. By using properly defined shutter mechanism of desired geometric patterns, it is possible to generate complex curves, generally of the first and second order of functions. Accordingly, it should be recognized that since the output can be produced in the form of an analog curve, the transducer can very adequately serve as a function generator or so-called signal generator. Thus, by generating a proper geometric pattern in the shutter mechanism, it is now possible to produce a parabolic output, a sinusoidal output, etc.

Digital Transducer

It is also possible to provide a modified form of transducer B, which is more fully illustrated in FIGS. 4—6 and which is capable of producing a digital output signal. The transducer B is similar to the transducer A in that the mechanism which provides the mechanical motion is substantially identical. However, the P-E converter, which is more fully illustrated in FIG. 4, has been modified. The transducer B generally comprises a P-E converter 41, which includes an outer housing 41', in the form of an open-ended tubular member. Rigidly secured to one end of the housing 41' is a lamp socket 42 for retaining an emitter lamp 43. Secured to the opposite open end of the housing 41' is a conventional photocell 44, which is similar to the photocell 31. The light socket 43 is conventionally provided with conductors 45 for connection to a suitable source of electrical current $E_{in}$. The photocell is also provided with conductors 45' for connection to the source of electrical current $E_{in}$.

One sidewall of the housing 41' is cut away in the provision of a slot to accommodate a light transparent retaining block 46 having a keyway 47 for accommodating a shutter 48. Secured to the outer end of the shutter 48 is a yoke 49, which includes a pair of spaced opposed conductive arms 50, 50', which are separated by means of an insulating strip 51. By reference to FIG. 4, it can be seen that the arms 50, 50' surround the upstanding pin 17 in such manner as to provide a slight degree of freedom of movement for the pin 17 between the two arms 50, 50'.

A conventional schmidt trigger 52 is connected to one of the conductors 45', the other input terminal of the schmidt trigger 52 being grounded. A Zener diode $z$ is interpassed in one of the conductors 45' and an input resistor $r$ is interpassed in the other of the conductor 45'.

Also connected to the two arms 50, 50' and the pin 17 are three conductors 53, which are in turn, connected to a conventional pulse counter 54, for reasons which will presently more fully appear. The output of the schmidt trigger 52 is connected to the pulse counter 54 by means of a conductor 55.

In the transducer B, the guide block 46 and shutter 48 are both transparent and of sufficient optical quality that they produce no light interference effects. Mounted on the flat face of the shutter 48, which is opposed to the photocell 44 is a film containing a replica of a diffraction grating 56. Also mounted in the housing 41' and being located between the shutter 48 and the photocell 44 is a transparent block 57 which is preferably formed of methyl methacrylate or other suitable light transparent material and which is pivotal in the housing 41' by means of a pair of pivot pins 58. Also mounted on the flat face of the block 57 is a transparent sheet or film preferably formed by Mylar or other suitable material which contains a replica of a diffraction grating 59. The gratings 56, 59, each generally containing a series of parallel lines of uniform width and spacing so that there is approximately a one to one ratio of light to dark areas on each of the gratings. In the case of the present invention, a transmission grating is employed as opposed to a reflection grating. However, it should be recognized that one skilled in the art could very simply modify the device to employ a reflection grating as well.

As the shutter 48 is shifted inwardly and outwardly responsive to movement of the mechanical mechanism previously described, a Moire pattern is projected against the photocell 44. It can be seen that as the diffraction grating 56 is shifted with respect to the diffraction grating 59, and in a plane perpendicular to the path of light, the effective number of lines per inch of grating displacement projected against the photocell is changed. The nature of the Moire pattern is such that with a suitable collimating lens (not shown) in the system, it is possible to project an image on the photocell of approximately 50 percent light transmission to 0 percent light transmission as a result of displacement of the shutter. It should also be recognized that the distance between the two diffraction gratings 56, 59 is a function of the image or shadow displacement on the photocell. Accordingly, as the two gratings 56, 59 are spaced further apart from each other, a smaller shutter displacement will produce an equivalent image displacement or shadow displacement of the Moire pattern on the photocell 44.

By further reference to FIG. 4, it can be seen that the transparent block 57 is biased to rotate in a counterclockwise direction by means of a compression spring 60. Coacting with the spring 60 is a suitable adjusting screw 61 which is located in a boss 62 formed in the housing 41'. The boss 62 contains an internally threaded section for rotating the adjustment screw 61. Thus as the screw is turned, it can either permit the spring 60 to rotate the block 57 in a clockwise direction, or the block 57 can be rotated in a counterclockwise direction, reference being made to FIG. 4, against the action of the spring 60. By this adjustment, it is possible to compensate for any particular gauge mechanism displacement to enable the photocell 44 to read the same output. If the photocell 44 is a photoresistive type element, it is possible to employ a voltage divider circuit so that the voltage drop across the photocell 44 will vary depending upon the light incident upon the cell.

As the Moire pattern is projected on the photocell 44 responsive to displacement of the shutter 48, a number of pulses are produced as a function of the number of line crossings. Accordingly, as a line on the diffraction grating 56 crosses a space on the diffraction grating 59, the photocell 44 will sense a light differential and generate a pulse in response thereto. The resolution of the pulse generated by the photocell 44 can be substantially increased by means of the schmidt trigger 52 and each of the pulses are counted on the conventional pulse counter 54. Accordingly, by means of diffraction gratings of the type employed herein, it is possible to read out in real numbers. By suitably adjusting the spacing and lines per inch on each of the gratings, it is possible to produce any unscaled reading desired, so that the readout could be produced in exactly the same numbers as the gauge. The transducer B is very conveniently calibrated by means of the adjustment screw 61 since rotation of the block 57 will change the effective spacing between the lines of each of the diffraction gratings. Furthermore, it should be recognized that the number of pulses counted in the pulse counter 54 is a function of the shutter displacement as well as a function of the number of lines per inch and the distance existing between the two gratings 56, 59.

The counter 54 is preferably a bidirectional counter or so-called up-down counter so that pulse addition and pulse subtraction can be provided. Accordingly, as the shutter 48 moves in one direction, e.g., inwardly in the housing, the counter 54 will add the number of generated pulses. When the shutter 48 is shifted outwardly of the housing, the counter 54 will subtract the number of generated pulses. This selection of counting direction of the counter 54 is accomplished by means of the yoke 49 with the two fingers 50, 50'. The pin 17 will engage the finger 50 when the shutter is shifted outwardly of the housing and will engage the finger 50' when the shutter 48 is shifted inwardly in the housing. Accordingly, the pin will create a contact with the proper finger in order to program the counter 54 to either add or subtract. It should be recognized that the amount of freedom of movement of the pin 17 in the yoke 49 should be less than the spacing of the lines on each of the grating 56, 59.

By means of the transducer B, it is possible to sense a change in a physical variable and produce a digital readout in direct proportion to this change. In like manner, the readout can be connected to any suitable recording device or a computer. This type of transducer is ideally suited for interfacing with digital computing mechanism since the output thereof is directly compatible with most commercially available digital computing equipment.

Combination Analog-Digital Transducer

It is possible to provide a combination analog-digital transducer C, which is more fully illustrated in FIGS. 7—10. The analog-digital transducer C generally includes a combination of the two transducers A and B. By reference to FIGS. 7 and 8, it can be seen that the transducer C generally comprises an outer housing 70 constructed in the form of an open-ended tubular member. Mounted in one end of the housing 70 is a light socket 71 for accommodating an exciter lamp 72. Mounted within the other end of the housing are a pair of substantially identical photocells 73, 74, which are similar to the photocell 31. A divider 75 is located in the housing 70 and extends between the photocells 73, 74 in order to provide two distinct light paths to each of these cells. The sidewall of the housing 70 is cut away in the provision of a slot to accommodate a guide block 76, which is provided with a keyway 77 for accommodating a shutter 78.

The shutter 78 is divided into an upper analog type shutter section 79 and a lower digital type shutter section 80. Accordingly, when the shutter 78 moves responsive to the actuation of the mechanical mechanism previously described, the upper section 78 will control the amount of light incident on the photocell 73 from the exciter lamp 72. The lower section 80 is provided with a film having a replica of a diffraction grating 81 mounted on the surface of the section 80 opposed to the photocell 74. A transparent block pivotally mounted in the lower light path has a replica of a diffraction grating which coacts with the diffraction grating 81 on the shutter section 80 in the same manner as the diffraction grating 56 coacts with the diffraction grating 59. The block holding the grating 81 is located between the shutter section 80 and the photocell 84 and furthermore, is pivoted in the same manner as the block 57. The photocell 73 is provided with an output cord 82 for connection to a suitable analog readout device and the photocell 74 is provided with a connector 83 for connection to circuitry similar to that used in the transducer B in order to achieve a digital readout. In this manner, it is possible to produce both an analog output and a digital output responsive to the movement of the shutter 78 in the same manner as described in connection with the operation of the transducer A and the transducer B.

By virtue of their construction, the transducers of the present invention are much more accurate and sensitive than the transducers extent in the art. For example, in the commercially available transducers, such as a strain gauge, the change in electrical resistance is proportional to the mechanical strain to which it is subjected. The resulting output signal represents the voltage analog of the mechanical deformation of a wire or foil multiaxial array sensing member.

However, it should be observed that a microinch change of the sensing member results for each inch of differential reading on the gauge. Accordingly, the change in resistance is exceedingly small. Typically the change in resistance is considerably less than 35 ohms in a prior art transducer. However, with the transducers of the present invention, it is possible to achieve a resistance change of up to 1 megaohm.

It is also possible to add a circuit interrupting compensating apparatus R to either of the transducers B or C in the manner as schematically illustrated in FIG. 12. The compensating apparatus R is particularly useful with the digital readout transducer elements to prevent erroneous readings in the event of a system power failure, and for operative disconnection from the pressure system in order to enable calibration.

The compensating apparatus R generally comprises a two position solenoid valve 90 having a valve body 91, a solenoid coil 92 and an armature 93 movable responsive to energization of the coil 92. The solenoid valve 90 is interposed between source of pressure and the transducer B or C and includes a pressure line 94 extending between the source of pressure and the valve body 91. A breather line 95 may also be connected to the valve body 91 in a manner as illustrated in FIG. 12. A valve seat 96 is movable with the armature 93 to a first seated position to prevent fluid flow through the valve 90 to the transducer B or C in the event that power to the solenoid coil 93 in interrupted. The valve seat 96 is also movable to a second position to enable fluid flow through the valve 90 from the source of pressure to the transducer B or C, upon energization of the coil 92. It should be recognized that the solenoid 92 is connected to the same power source as the schmidt trigger 52 and the counter 54.

A conventional time delay element such as a time delay relay 97 is operatively interposed between the source of electrical power and the solenoid coil 92. The relay 97 is designed to prevent energization of the solenoid coil 92 for a predetermined period of time after initiation of electrical power. Thus, if an electrical power failure should occur, the solenoid coil 92 would become immediately deenergized, thereby enabling the armature 93 to shift the valve seat 96 to the seated or flow interrupting position. It can thus be seen that a failure of electrical power would prevent a fluid flow condition between the source of pressure and the transducer B or C. It should also be recognized that a power failure would cause deenergization of both the schmidt trigger 52 and the counter 54.

After a restoration of power, both the schmidt trigger 52 and the counter 54 would be reenergized. However, the solenoid coil 92 would not be reenergized for the predetermined period of time, until enabled by the time delay relay 97. This predetermined time delay would enable the counter 55 and all power supplies to establish proper operating voltage levels. After the predetermined time delay period, contacts (not shown) in the time delay relay 97 would close, thereby permitting energization of the solenoid coil 92. Energization of the coil 92 would enable the armature 93 to shift the valve seat 96 to a position where fluid communication between the pressure source and the transducer B or C, through the valve 90 is established.

It can be seen that the compensating apparatus thus described also provides a convenient way of calibrating the transducer without physically disconnecting the same from the pressure source. The compensating apparatus R also enables the counter and transducer gauge to return to its zero reading or rest position, so that counting can again begin from a zero or rest position of the gauge needle upon restoration of power. This type of system will eliminate any possibility of an erroneous count upon initiation of reading.

A pressure transducer operating on an aneroid can type principle to provide a movable force has been illustrated and described in connection with the present invention. However, it should be recognized that a pressure transducer employing mechanical movement responsive to the pressure conditions could be used. In like manner, the same holds true of other types of transducers such as temperature transducers which operate with bimetallic strips, etc. In these latter devices, the movement of the bimetallic strip, which constitutes the mechanical movement, will also operate to initiate movement of the shutter and thereby creates an electrical output in direct proportion to the movement of the bimetallic element. In this manner, the electrical output is a direct measure of the temperature condition, which effects the bimetallic element. In essence, the present invention is applicable to any transducer which is capable of producing a motion for coupling into a shutter located between a radiation emitter and a radiation sensitive element.

In like manner, it should be recognized that the transducers of the present invention are not limited to pressure and temperature measurement or sensing. Any linear displacement of a mechanism could be sensed and converted into a direct electrical output with the transducer of the present invention. For example, the linear displacement of a mechanism, as in a machine tool, could be coupled to the shutter mechanism for producing an electrical output. Thus, the transducer of the present invention could be suitably employed as a height gauge or an electronic dial indicator. The transducers could be used to provide signals for numerical control of a machine tool, or other mechanical device, either as an original signal source or as a feedback source to monitor location or position of a machine tool or other device.

It should also be recognized that a standard gauge which employs the pressure transducer can be used, not only for its normal purpose; but the transducer output could also be connected to a tape recorder or chart recorder in order to provide a permanent record. Furthermore, it should be recognized that the output of the transducer of the present invention could be interfaced directly with a computer for process control. This is particularly true in the cases of the digital output device since the output readily lends itself for direct interfacing with conventional digital computer mechanisms.

Accordingly, while the transducer of the present invention has been illustrated and described in connection with three embodiments it should be recognized that a large number and a wide variety of devices could be constructed by embodying the principles of the present invention therein. It should also be understood that changes and modifications in the form, construction, arrangement, and combination of parts presently described and pointed out may be made and substituted for those herein shown without departing from the nature and principle of our invention.

We claim:

1. A transducer for detecting a physical variable and converting a force produced by such physical variable to an electrical output, said transducer comprising movable means being movable responsive to the force produced by said physical variable, single radiation emitting means emitting desired levels of radiation, radiation sensitive means located to receive the radiation from said radiation emitting means, means forming a first path for the radiation from said single radiation emitting means to become incident on a first section of said radiation sensitive means and means forming a second path for the radiation from said single radiation emitting means to become incident on a second section of said radiation sensitive means, and radiation interrupter means operatively connected to said movable means and controlling the form of radiation in said first path to produce an electrical analog output from the first section of said radiation sensitive means responsive to the position of said movable means, said radiation interrupter means also controlling the form of radiation in said second path to produce an electrical digital output from the second section of said radiation sensitive means responsive to movement of said movable means simultaneously with the production of said electrical analog output.

2. A combination analog-digital transducer for detecting a physical variable and converting a force produced by such physical variable to an electrical output, said transducer comprising movable means being movable responsive to the force produced by said physical variable, single radiation emitting means emitting desired levels of radiation first and second radiation sensitive means located to receive the radiation from said single radiation emitting means, radiation interrupter means operatively connected to said movable means and movable thereby, an opaque interrupting element on said radiation interrupting means and being movable with said interrupter means from a position said opaque element substantially blocks all radiation with respect to said first radiation sensitive means to a position where said opaque interrupting element substantially provides no radiation interference with respect to said radiation sensitive means, said opaque interrupting element also being movable to positions intermediate said first two named positions to control the amount of radiation incident on said first radiation sensitive means to thereby produce an electrical analog output from said first radiation sensitive means responsive to the position of said movable means, a somewhat transparent interrupting element on said radiation interrupting means and being movable therewith, a first set of rulling on said somewhat transparent interrupting element and being disposed between said single radiation emitting means and said second radiation sensitive means, a second set of rullings located in juxtaposition to said first set of rullings and cooperating therewith for producing a Moire fringe effect when moved with respect to each other and to thereby control the radiation incident on said second radiation sensitive means, digitizing means operatively associated with said second radiation sensitive means to produce a digital output in the form of discrete pulses from the radiation form incident on said second radiation sensitive means responsive to the movement of said movable means simultaneously with the production of said electrical analog output.

3. The transducer of claim 2 further characterized in that selective means is operatively associated with said digitizing means and said movable means to cause an addition of discrete pulses when said movable means moves in one direction and a subtraction of discrete pulses when said movable means moves in a reverse direction.

4. A direct proximate and remote readout gauge system for recording a readout of a physical variable, said system comprising sensing means to measure said physical variable, a first movable element which moves in response to a change in a physical variable, a gauge element connected to said first movable element and movable in response to said first movable element and providing a proximate readout, a transducer for also detecting said physical variable and converting a force produced by such physical variable to an analog type electrical output, said transducer comprising movable means being movable responsive to the force produced by said physical variable, single radiation emitting means emitting desired levels of radiation, radiation sensitive means located to receive the radiation from said single radiation emitting means, radiation interrupter means having a portion opaque to said radiation, said interrupter means being operatively connected to said movable means and being movable thereby from a position where the opaque portion substantially blocks all radiation with respect to said radiation sensitive means to a position where said opaque portion provides no radiation interference with respect to said radiation sensitive means, said interrupter means also being movable to positions intermediate said first two named positions to control the amount of radiation incident on said radiation sensitive means to produce an electrical analog output from said radiation sensitive means responsive to the position of said movable means and radiation interrupter means, and remote readout means operatively connectable to said radiation sensitive means to provide a remote readout of said physical variable.

5. The system of claim 4 further characterized in that the force produced by said physical variable force is a mechanical or fluid force.

6. The system of claim 4 further characterized in that:
a. said single radiation emitter means is an emitter light,
b. said radiation sensitive means is a photocell,
c. said radiation interrupter means is a shutter mechanism located to affect the light incident on said photocell.

7. The system of claim 4 further characterized in that means is located in said transducer to form a first path for the radiation from said single radiation emitting means and means is located in said transducer to form a second path for the radiation from said single radiation emitting means, a first element on said radiation interrupter means to properly characterize the radiation in said first path incident on said radiation sensitive means to produce an analog output in the form of a continuous signal and the radiation in said second path to produce a digital output in the form of discrete pulses from said radiation sensitive means responsive to movement of said movable means.

8. A direct proximate and remote readout gauge system for providing a readout of a physical variable, said system comprising sensing means to measure said physical variable, a first movable element which moves in response to a change in a physical variable, a gauge element connected to said first movable element and movable in response to said first movable element and providing a proximate readout, a digital transducer for also detecting said physical variable and converting a force produced by such physical variable to an electrical output, said transducer comprising movable means being movable responsive to the force produced by said physical variable, single radiation emitting means emitting desired levels of radiation, radiation sensitive means located to receive the radiation from said single radiation emitting means, a first set of rullings disposed between said radiation emitting means and radiation sensitive means, radiation interrupter means operatively connected to said movable means and being movable thereby, a second set of rullings associated with said radiation interrupter means and being located in juxtaposition to said first set of rullings and cooperating therewith for producing a Moire fringe effect when moved with respect to each other, and to thereby control the radiation incident on said radiation sensitive means, digitizing means operatively associated with said radiation sensitive means to produce a digital output in the form of discrete pulses from the radiation form incident on said radiation sensitive means responsive to movement of said movable means, selective means operatively associated with said digitizing means and said movable means to cause an addition of discrete pulses when said movable means moves in one direction and a subtraction of pulses when said movable means moves in a reverse direction, and remote readout means operatively connected to said radiation sensitive means to provide a remote readout of said physical variable.

9. The system of claim 8 further characterized in that the force produced by said physical variable force is a mechanical or fluid force.

10. The system of claim 8 further characterized in that:
a. said single radiation emitter means is an emitter light,
b. said radiation sensitive means is a photocell,
c. said radiation interrupter means is a shutter mechanism located to effect the light incident on said photocell.

11. The system of claim 8 further characterized in that pulse counting means is operatively connected to said digitizing means to count the discrete pulses from said digitizing means.

12. The system of claim 8 further characterized in that the first rulling is a diffraction grating and the second rulling is a diffraction grating.

13. The system of claim 8 further characterized in that the selective means comprises a pair of contact elements operatively associated with said movable means and a contactor element which enables an addition of pulses when in electrical contact with one contact element and a subtraction of pulses when in contact with the other contact element.

14. A condition responsive device for providing a digital output signal in response to a motion producing force, said device comprising detecting means for detecting the motion producing force and being responsive thereby, a radiation active element capable of causing conversion of said motion producing force to an electrical output, output means operatively associated with said radiation active element to produce a Moire type fringe pattern with respect to said radiation active element, pulse producing means operatively connected to said output means to produce an electrical output in discrete pulses in response to said motion producing force, and compensating means including a force controlling element operatively connected to said pulse producing means and detecting means and providing for interruption of the detecting means and preventing said detecting means from being responsive to said motion producing force upon power failure conditions to said device, said compensating means also including a time delay element to prevent operation of said pulse producing means for a predetermined period of time after initiation of power conditions to said device.

15. The device of claim 14 further characterized in that the force controlling element is a solenoid control valve.

16. A digital transducer for detecting a physical variable and converting a force produced by such physical variable to an electrical output, said transducer comprising movable means being movable responsive to the force produced by said physical variable, radiation emitting means emitting desired levels of radiation, radiation sensitive means located to receive the radiation from said radiation emitting means, a first set of rullings disposed between said radiation emitting means and radiation sensitive means, radiation interrupter means operatively connected to said movable means and being movable thereby a second set of rullings associated with said radiation interrupter means and being located in juxtaposition to said first set of rullings and cooperating therewith for producing a Moire fringe effect when moved with respect to each other, and to thereby control the radiation incident on said radiation sensitive means, digitizing pulse producing means operatively associated with said radiation sensitive means to produce a digital output in the form of discrete pulses from the radiation form incident on said radiation sensitive means responsive to movement of said movable means, selective means operatively associated with said digitizing pulse producing means and said movable means to cause an addition of discrete pulses when said movable means moves in one direction and a subtraction of pulses when said movable means move in a reverse direction, and compensating means including a force controlling element operatively connected to said pulse producing means and providing for interruption of the pulse producing means and preventing said radiation sensitive means and pulse producing means from being responsive to said motion producing force upon power failure condition to said device, said compensating means also including a time delay element to prevent operation of said pulse producing means for a predetermined period of time after initiation of power conditions to said device.

17. The transducer of claim 16 further characterized in that the selective means comprises a pair of contact elements operatively associated with said movable means and a contactor element which enables an addition of pulses when in electrical contact with one contact element and a subtraction of pulses when in contact with the other contact element.